UNITED STATES PATENT OFFICE.

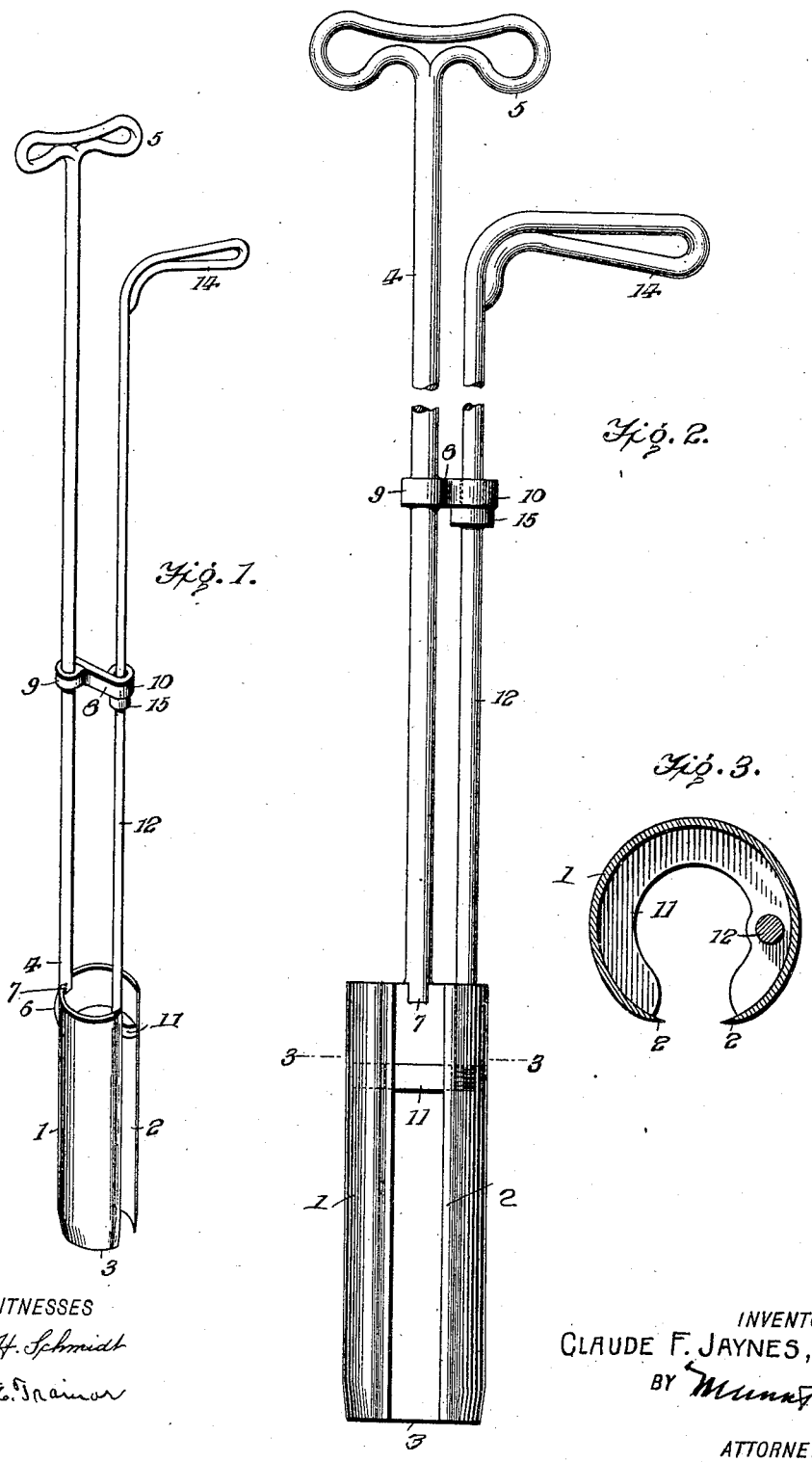

CLAUDE FOX JAYNES, OF SEATTLE, WASHINGTON.

PLANTER.

969,701.　　　　　Specification of Letters Patent.　　Patented Sept. 6, 1910.

Application filed April 14, 1909, Serial No. 489,769.　Renewed July 25, 1910.　Serial No. 573,765.

*To all whom it may concern:*

Be it known that I, CLAUDE F. JAYNES, a citizen of the United States, and a resident of Seattle, in the county of King and State of Washington, have made certain new and useful Improvements in Planters, of which the following is a specification.

My invention is an improvement in planters and consists in certain novel constructions and combinations of parts hereinafter described and claimed.

Referring to the drawings forming a part hereof—Figure 1 is a perspective view of my improvement, Fig. 2 is a side view, and Fig. 3 is a section on the line 3—3 of Fig. 2.

The present embodiment of the invention, comprises a cylindrical shell, 1, having a longitudinal split, 2, and having one of its ends provided with a cutting edge, 3. A handle, 4, is secured to the opposite end of the shell, the said handle being provided with a lug, 6, engaging the outside of the shell and suitably secured thereto, and a lug, 7, engaging the inner surface of the shell, the free end of the handle being provided with a grip, 5, as shown in Figs. 1 and 2. A plunger, 11, is slidable in the shell, the said plunger comprising a split ring as shown in Fig. 3, and the plunger is so arranged with respect to the shell, that the split of the ring registers with the split of the shell. A handle, 12, is connected with the plunger, the said handle extending upwardly alongside of the handle, 4, and being provided with a grip, 14, for convenience in manipulating the plunger. A bracket, 8, has one of its ends formed into a ring 9, and fixedly engaging the handle 4, and the other end is provided with a bearing 10, through which slides the handle 12 of the plunger 11, and the said handle is provided with a stop 15 for limiting the upward movement of the plunger, the said stop being adapted to engage the bearing as shown in Figs. 1 and 2.

My improvement is especially adapted for transplanting plants, and when so used, the improvement is so placed that the plant extends longitudinally of the shell, after which the shell is forced into the earth a suitable depth, and the shell and plant are lifted out by means of the handle 4. The plant and shell are then transported to the hole into which the plant is to be introduced, and the shell is inserted therein. Pressure is now exerted on the grip 14 of the handle 12 to retain the plunger 11 in a fixed position and the shell is withdrawn, thus leaving the plant with the earth taken up therewith in the hole.

The improvement is simply constructed, and the arrangement of the split of the plunger registering with the split of the shell, permits the device to be placed around a plant such as a young tree, without it being necessary to disturb the foliage of the tree.

In this class of devices as is well known, it is necessary at times to exert great force upon the pushing handle in order to press the cylindrical shell into the earth to the necessary depth and it is important that the pushing handle should be entirely unobstructed and that the handle of the expelling plunger be located at all times and in all positions of operation, below the upper end of the pushing handle. It is also desirable to locate this plunger handle laterally to the shell handle, and as far as possible from the said shell handle within the limits of proper operation. In securing these results I connect the plunger handle or rod 12 with one arm of the crescent shaped plunger as distinguished from connecting the handle centrally between the split ends of the crescent or plunger, and provide the shell rod 4 at a point below its grip 5 with a laterally extending arm 8 rigid at one end with the rod 4 and provided at its other end with an upright guide in which the plunger rod 12 is held so that it can slide freely up and down. I also turn the grip end 14 of the rod 12 outwardly so it can be readily operated without in any way interfering with the rod 4 or the grip 5 thereof, as will be understood from the drawing.

It will be noticed from the drawing that the handle rod 12 connects with one arm of the crescent plunger at a point about mid-way between the center of the crescent and the end of said arm and that the upper end of the handle rod lies in all positions of the parts below the upper end of the handle of the shell and is guided in the arm 8 which is rigidly secured at one end to the handle rod of the shell and projects laterally therefrom.

I claim—

The transplanter substantially as herein described comprising a shell split longitudinally forming an opening for the application of the shell over a plant, a handle rod projecting upwardly from said shell at a point midway between the edges thereof, a split ring plunger movable up and down within the shell, a handle rod connected with one arm of said split ring at a point about mid way between the crown of the split ring and the end of said arm, the upper end of said handle rod lying in all positions of the parts below the upper end of the handle rod of the shell and the arm secured rigidly at one end to the handle rod of the shell and projecting laterally thence and having an opening in which the handle rod of the plunger is movable vertically substantially as and for the purposes set forth.

CLAUDE FOX JAYNES.

Witnesses:
ARTHUR O. DILLON,
C. O. TUALHEIM.